(12) United States Patent
Sato

(10) Patent No.: US 7,512,353 B2
(45) Date of Patent: Mar. 31, 2009

(54) ARTICLE MANAGING APPARATUS

(75) Inventor: Junji Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 11/014,575

(22) Filed: Dec. 16, 2004

(65) Prior Publication Data

US 2005/0137945 A1     Jun. 23, 2005

(30) Foreign Application Priority Data

Dec. 18, 2003   (JP)   ............... 2003-420400

(51) Int. Cl.
  *G03G 21/02*   (2006.01)
  *G06F 17/60*   (2006.01)
(52) U.S. Cl. .......................... 399/79; 705/28
(58) Field of Classification Search .............. 399/79, 399/81; 705/28
  See application file for complete search history.

(56) References Cited

U.S. PATENT DOCUMENTS

| | | | |
|---|---|---|---|
| 5,491,540 A | 2/1996 | Hirst | |
| 6,459,863 B2 * | 10/2002 | Kawabe | ................. 399/79 |
| 2002/0071133 A1 * | 6/2002 | Haines | ................. 399/81 X |
| 2004/0204986 A1 * | 10/2004 | Shimbori et al. | ............. 705/14 |
| 2005/0075954 A1 * | 4/2005 | Matsumoto et al. | ........... 705/28 |

FOREIGN PATENT DOCUMENTS

| | | |
|---|---|---|
| DE | 102 32 956 A1 | 3/2003 |
| JP | 06-024102 A | 2/1994 |
| JP | 2002183832 A * | 6/2002 |
| JP | 2003-187123 A | 7/2003 |
| JP | 2003-187124 A | 7/2003 |
| JP | 2003-256730 A | 9/2003 |
| JP | 2004046633 A * | 2/2004 |

OTHER PUBLICATIONS

JP 2002-183832 A, Yamashita et al., JPO Machine Translation.*

* cited by examiner

*Primary Examiner*—David M Gray
*Assistant Examiner*—Erika J. Villaluna
(74) *Attorney, Agent, or Firm*—Panitch Schwarze Belisario & Nadel LLP

(57) ABSTRACT

In a print system having printers connected to a network, consumables of the printers are managed. A consumables price DB and a budget DB store prices of the consumables and a predetermined purchase money amount. A consumables use residual amount discriminating unit obtains consumables use residual amounts of the printers. A consumables ordering discriminating unit discriminates the ordering necessity of the consumables from the consumables use residual amounts. Order money amount accumulating means accumulates order money amounts of the ordering necessity consumables on the basis of the prices of the consumables. An order consumables deciding means decides the ordering necessity consumables as order consumables corresponding to the period of time until an accumulated money amount exceeds the predetermined purchase money amount. A consumables ordering processing unit collects the order consumables in a predetermined format and orders them.

18 Claims, 21 Drawing Sheets

Fig. 4

| PRINTER IDENTIFICATION ID | MODEL NAME OF PRINTER | NAME OF CONSUMABLES | USE RESIDUAL AMOUNT | DISCRIMINATION RESIDUAL AMOUNT | NECESSITY OF ORDERING |
|---|---|---|---|---|---|
| 172.51.24.28 | A PRINTER | TONER | FULL | — | UNNECESSARY |
| 172.51.24.28 | A PRINTER | IMAGE DRUM UNIT | FULL | — | UNNECESSARY |
| 172.51.24.31 | B PRINTER | BLACK TONER | 0% | 5% | NECESSARY |
| 172.51.24.31 | B PRINTER | CYAN TONER | 10% | 5% | UNNECESSARY |
| 172.51.24.31 | B PRINTER | MAGENTA TONER | 5% | 5% | NECESSARY |
| 172.51.24.31 | B PRINTER | YELLOW TONER | 5% | 5% | NECESSARY |
| 172.51.24.31 | B PRINTER | BLACK IMAGE DRUM UNIT | 5% | 5% | NECESSARY |
| 172.51.24.31 | B PRINTER | CYAN IMAGE DRUM UNIT | 50% | 5% | UNNECESSARY |
| 172.51.24.31 | B PRINTER | MAGENTA IMAGE DRUM UNIT | 50% | 5% | UNNECESSARY |
| 172.51.24.31 | B PRINTER | YELLOW IMAGE DRUM UNIT | 50% | 5% | UNNECESSARY |
| 172.51.24.1 | C PRINTER | INK CARTRIDGE | EMPTY | — | NECESSARY |
| 172.51.24.101 | A FAX | TONER | 0% | 5% | NECESSARY |
| 172.51.24.124 | A FAX | IMAGE DRUM UNIT | 0% | 5% | NECESSARY |
| ...... | ...... | ...... | ...... | ...... | |

Fig.5

| MODEL NAME OF PRINTER | NAME OF CONSUMABLES | ORDER CODE | PRICE | ACCUMULATED ORDER MONEY AMOUNT | ACCUMULATION ORDER MONEY AMOUNT LIMIT VALUE |
|---|---|---|---|---|---|
| | | | | | 100,000 |
| B PRINTER | BLACK TONER | M105-0001 | @6,000 | 60,500 | |
| B PRINTER | MAGENTA TONER | M105-0003 | @6,000 | 66,500 | |
| B PRINTER | YELLOW TONER | M105-0004 | @6,000 | 72,500 | |
| B PRINTER | BLACK IMAGE DRUM UNIT | M105-0201 | @12,000 | 78,500 | |
| C PRINTER | INK CARTRIDGE | M008-0001 | @4,500 | 95,000 | |
| | | | | | ↓ ORDER IMPOSSIBLE |

Fig.6

TO OOO SUPPLY CO., LTD.  XXX CORPORATION
WE ORDER THE FOLLOWING CONSUMABLES.  THE GENERAL AFFAIRS

| NO. | ARTICLE NUMBER | ARTICLE NAME | UNIT PRICE | QUANTITY |
|---|---|---|---|---|
| 1 | M105-0001 | BLACK TONER FOR B PRINTER | @6,000 | 1 |
| 2 | M105-0003 | MAGENTA TONER FOR B PRINTER | @6,000 | 1 |
| 3 | M105-0004 | YELLOW TONER FOR B PRINTER | @6,000 | 1 |
| 4 | M105-0001 | BLACK ID UNIT FOR B PRINTER | @12,000 | 1 |
| 5 | M008-0001 | INK CARTRIDGE FOR B PRINTER | @4,500 | 1 |

TOTAL AMOUNT ¥34,500- (NET)

Fig. 9

ALTHOUGH THE FOLLOWING CONSUMABLES ARE APPROACHING THE EXPIRATION
OF THE LIFE, THEY CANNOT BE ORDERED BECAUSE THE ORDER ACCUMULATED
MONEY AMOUNT EXCEEDS THE UPPER LIMIT

| NO. | APPARATUS ID | APPARATUS NAME | ARTICLE NAME | ARTICLE NUMBER | UNIT PRICE |
|---|---|---|---|---|---|
| 1 | 172. 51. 24. 124 | OKIFAX2980 | TONER | M112-0001 | @5,500 |
| 2 | ...... | | | | |

Fig.13

| PRINTER IDENTIFICATION ID | MODEL NAME OF PRINTER | NAME OF CONSUMABLES | ORDER CODE | PRICE |
|---|---|---|---|---|
| 172.51.24.31 | A PRINTER | BLACK TONER | M105-0001 | @6,000 |
| 172.51.24.31 | A PRINTER | MAGENTA TONER | M105-0003 | @6,000 |
| 172.51.24.31 | A PRINTER | YELLOW TONER | M105-0004 | @6,000 |
| 172.51.24.31 | A PRINTER | BLACK IMAGE DRUM UNIT | M105-0201 | @12,000 |
| 172.51.24.101 | B PRINTER | INK CARTRIDGE | M008-0001 | @4,500 |
| 172.51.24.124 | A FAX | TONER | M112-0001 | @5,500 |
| 172.51.24.124 | A FAX | IMAGE DRUM UNIT | M112-0101 | @10,500 |
| 172.51.24.124 | A FAX | FUSER UNIT | M112-0201 | @15,000 |

*Fig.14*

| ORDER CODE | PRIORITY | MODEL NAME OF PRINTER | NAME OF CONSUMABLES |
|---|---|---|---|
| M008-0001 | 1 | B PRINTER | INK CARTRIDGE |
| ...... | ...... | ...... | ...... |
| M105-0001 | 2 | A PRINTER | BLACK TONER |
| M105-0002 | 2 | A PRINTER | CYAN TONER |
| M105-0003 | 2 | A PRINTER | MAGENTA TONER |
| M105-0004 | 2 | A PRINTER | YELLOW TONER |
| M105-0201 | 3 | A PRINTER | BLACK IMAGE DRUM UNIT |
| ...... | ...... | ...... | ...... |
| M112-0001 | 2 | A FAX | TONER |
| M112-0101 | 3 | A FAX | IMAGE DRUM UNIT |
| M112-0201 | 4 | A FAX | FUSER UNIT |

Fig.15

| MODEL NAME OF PRINTER | NAME OF CONSUMABLES | ORDER CODE | PRICE | ACCUMULATED ORDER MONEY AMOUNT | ACCUMULATION ORDER MONEY AMOUNT LIMIT VALUE |
|---|---|---|---|---|---|
| | | | | | 100,000 |
| B PRINTER | INK CARTRIDGE | M008-0001 | @4,500 | 60,500 | |
| A PRINTER | BLACK TONER | M105-0001 | @6,000 | 65,000 | |
| A PRINTER | MAGENTA TONER | M105-0003 | @6,000 | 71,000 | |
| A PRINTER | YELLOW TONER | M105-0004 | @6,000 | 77,000 | |
| A FAX | TONER | M112-0001 | @5,500 | 83,000 | |
| | | | | 88,500 | ↓ORDER IMPOSSIBLE |

Fig.19

| PRINTER IDENTIFICATION ID | MODEL NAME OF PRINTER | NAME OF CONSUMABLES | ORDER CODE | PRICE |
|---|---|---|---|---|
| 172.51.24.31 | A PRINTER | BLACK TONER | M105-0001 | @6,000 |
| 172.51.24.31 | A PRINTER | MAGENTA TONER | M105-0003 | @6,000 |
| 172.51.24.31 | A PRINTER | YELLOW TONER | M105-0004 | @6,000 |
| 172.51.24.31 | A PRINTER | BLACK IMAGE DRUM UNIT | M105-0201 | @12,000 |
| 172.51.24.101 | B PRINTER | INK CARTRIDGE | M008-0001 | @4,500 |
| 172.51.24.124 | A FAX | TONER | M112-0001 | @5,500 |
| 172.51.24.124 | A FAX | IMAGE DRUM UNIT | M112-0101 | @10,500 |
| 172.51.24.124 | A FAX | FUSER UNIT | M112-0201 | @15,000 |

Fig.20

| PRINTER IDENTIFICATION ID | GROUP ID |
|---|---|
| 172.51.24.28 | 1 |
| 172.51.24.31 | 2 |
| ---- | ---- |
| 172.51.24.101 | 2 |
| 172.51.24.124 | 5 |

Fig. 21

| MODEL NAME OF PRINTER | NAME OF CONSUMABLES | ORDER CODE | PRICE | ACCUMULATED ORDER MONEY AMOUNT | ACCUMULATION ORDER MONEY AMOUNT LIMIT VALUE |
|---|---|---|---|---|---|
| | | | | | 100,000 |
| A PRINTER | BLACK TONER | M105-0001 | @6,000 | 60,500 | |
| A PRINTER | MAGENTA TONER | M105-0003 | @6,000 | 66,500 | |
| A PRINTER | YELLOW TONER | M105-0004 | @6,000 | 72,500 | |
| A PRINTER | BLACK IMAGE DRUM UNIT | M105-0201 | @12,000 | 78,500 | |
| A FAX | TONER | M112-0001 | @5,500 | 90,500 | |
| | | | | 96,000 | ↓ ORDER IMPOSSIBLE |

ARTICLE MANAGING APPARATUS

BACKGROUND OF THE INVENTION

1. Field of the Invention

The invention relates to an article managing apparatus for managing article such as consumables for printing apparatuses in a print system including an arbitrary number of printing apparatuses.

2. Related Background Art

In recent years, there are many use forms of a printing apparatus as a print system in which one or a plurality of printing apparatuses are connected to a network and shared by a host apparatus connected to the same network. However, those printing apparatuses are not always disposed near the user. Therefore, a consumables management system for concentratedly perform stock management, ordering work, and the like of consumables (hereinafter, limited to the consumables for the printing apparatuses) is necessary.

In the conventional consumables management system, an article managing apparatus which serves as a consumables managing apparatus, for example, once per day, inquires of the printing apparatus (in the network) as a management target about a residual amount of the consumables. If it is determined as a result of the inquiry that the residual amount of the consumables is small, such a measure that a warning is generated to the user from the article managing apparatus, the managing apparatus collects notifications performed for a predetermined period of time and executes the ordering work, or the like is taken. A technique for accurately extracting an actual working history of the printing apparatus serving as fundamentals of those techniques or the like has also been opened (for example, refer to Abstract of JP-A-6-24102).

It is a problem to be solved that in print systems equipped in organizations such as enterprises, government and municipal offices, and the like in which a budget has been allocated every division, there is a risk that if the managing apparatus automatically executes the ordering work of consumables, the budget exceeds a budget limit allocated to the consumables in the overall budget.

SUMMARY OF THE INVENTION

It is an object of the invention to provide an article managing apparatus which can certainly manage consumables for printing apparatuses in a print system including an arbitrary number of printing apparatuses without exceeding a budget limit.

According to the present invention, there is provided an article managing apparatus for managing consumables of printing apparatuses in a print system having one or a plurality of printing apparatuses connected to a network, comprising:

a consumables data storing section which stores prices of the consumables and a predetermined purchase money amount;

a ordering necessity discriminating section which discriminates the necessity of ordering of the consumables;

a order money amount accumulating section which accumulates and adds order money amounts of the ordering necessity consumables determined by the ordering necessity discriminating section that the ordering is necessary on the basis of the prices of the consumables; and a order consumables deciding section which decides the ordering necessity consumables, as order consumables, determined by the ordering necessity discriminating section that the ordering is necessary until an accumulated money amount obtained by the order money amount accumulating section exceeds the predetermined purchase money amount.

Further, the article managing apparatus may comprise a residual amount detecting section which obtains consumables use residual amounts of the printing apparatuses. In the case, the performs discrimination on the basis of the consumables use residual amounts.

Further the article managing apparatus may comprise a ordering processing section which, after received a output indicating the consumables needs order from the ordering necessity discriminating section, orders the order consumables in a predetermined format.

Further, the article managing apparatus may comprise a target selecting section which, when the accumulated money amount does not exceeds the predetermined purchase money amount with respect to a predetermined printing apparatus and the accumulation is finished, changes a target to another printing apparatus, accumulates and adds the money amounts, and accumulates the order money amounts until the accumulated money amount exceeds the predetermined money amount.

Further, the article managing apparatus may comprise a warning display section which displays a warning of the necessity of the ordering with respect to the ordering necessity consumables determined by the ordering necessity discriminating section that the ordering is necessary after the accumulated money amount exceeded the predetermined purchase money amount.

Moreover, according to the present invention, there is provided an article managing apparatus for managing consumables of printing apparatuses in a print system having one or a plurality of printing apparatuses connected to a network, comprising:

a consumables data storing unit which stores prices of the consumables, priorities of the consumables, and a predetermined purchase money amount;

a residual amount detecting section which obtains consumables use residual amounts of all of the printing apparatuses connected to the network;

a order candidate selecting section which discriminates the necessity of the ordering of the consumables from consumables use residual amounts of all of the printing apparatuses;

a order priority setting section which sets order priorities on the basis of the priorities of the consumables with respect to the ordering necessity consumables determined by the order candidate selecting section that the ordering is necessary;

a order money amount accumulating section which accumulates and adds order money amounts of the ordering necessity consumables in order from the highest priority on the basis of the prices of the consumables;

a order consumables deciding section which decides the ordering necessity consumables, as order consumables, determined by the order candidate selecting section that the ordering is necessary until an accumulated money amount obtained by the order money amount accumulating section exceeds the predetermined purchase money amount; and a ordering processing section which collects the order consumables in a predetermined format and orders them.

Further, the article managing apparatus may comprise a target selecting section which changes an examination target to another printing apparatus when the order candidate selecting section finishes the examination of all of the consumables with respect to a predetermined printing apparatus.

Moreover, according to the present invention, there is provided an article managing apparatus for managing consumables of printing apparatuses in a print system having one or a plurality of printing apparatuses connected to a network, comprising:

a consumables data storing unit which stores prices of the consumables, a predetermined purchase money amount, and terminal group information for grouping the plurality of printing apparatuses;

a residual amount detecting section which obtains consumables use residual amounts of all of the printing apparatuses connected to the network;

a order candidate selecting section which discriminates the necessity of the ordering of the consumables from consumables use residual amounts of all of the printing apparatuses;

an intra-group priority setting section which sets order priorities on the basis of the grouping of the plurality of printing apparatuses with respect to the ordering necessity consumables determined by the order candidate selecting section that the ordering is necessary;

a order money amount accumulating section which accumulates and adds order money amounts of the ordering necessity consumables in order from the highest priority on the basis of the prices of the consumables;

a order consumables deciding section which decides the ordering necessity consumables, as order consumables, determined by the order candidate selecting section that the ordering is necessary until an accumulated money amount obtained by the order money amount accumulating section exceeds the predetermined purchase money amount; and a ordering processing section which collects the order consumables in a predetermined format and orders them.

Further, the article managing apparatus may comprise a target selecting section which changes an examination target to another printing apparatus when the order candidate selecting section finishes the examination of all of the consumables with respect to a predetermined printing apparatus.

A plurality of consumables in each of which the use residual amount is small and the ordering is decided to be necessary are ordered in a range where the accumulated money amount obtained by accumulating and adding their purchase prices does not exceed a predetermined money amount. Therefore, in the print systems equipped in the organizations such as enterprises, government and municipal offices, and the like in which the budget has been allocated every division, such an effect to eliminate the risk that the budget exceeds the budget limit allocated to the consumables can be obtained.

The above and other objects and features of the present invention will become apparent from the following detailed description and the appended claims with reference to the accompanying drawings.

BRIEF DESCRIPTION OF THE DRAWINGS

FIG. 4 is an explanatory diagram of information showing use residual amounts of consumables;

FIG. 5 is an explanatory diagram of order data (part 1);

FIG. 6 is an explanatory diagram of a list table of the order data;

FIG. 9 is an explanatory diagram of a list table of order impossible data;

FIG. 13 is an explanatory diagram of order candidate data (part 1);

FIG. 14 is an explanatory diagram of order priority data;

FIG. 15 is an explanatory diagram of the order data (part 2);

FIG. 19 is an explanatory diagram of the order candidate data (part 2);

FIG. 20 is an explanatory diagram of terminal group setting data; and

FIG. 21 is an explanatory diagram of the order data (part 3).

DETAILED DESCRIPTION OF THE PREFERRED EMBODIMENTS

An article managing apparatus of the invention, serving as a consumables managing apparatus to manage the order of article such as consumables), has a consumables price DB (database) for storing prices of consumables and a budget DB (database) for storing predetermined purchase money amounts. A plurality of consumables in each of which a use residual amount is small and the ordering is decided to be necessary are automatically ordered in a range where an accumulated money amount obtained by accumulating and adding their purchase prices does not exceed a predetermined money amount.

Embodiment 1

Figure 1:
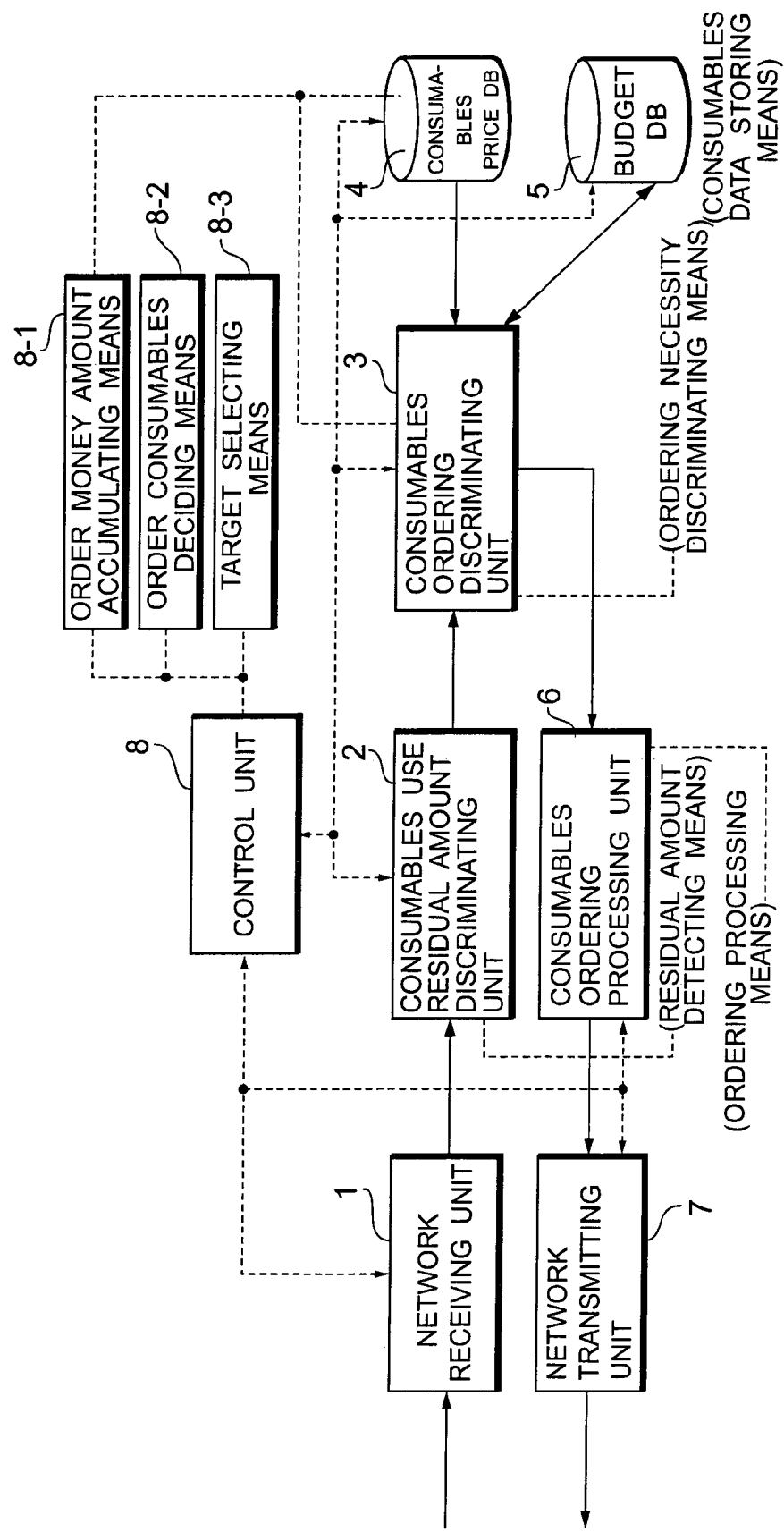
FIG. 1 is a block diagram showing a construction of the embodiment 1.

FIG. 1 is a block diagram showing a construction of the embodiment 1.

As shown in the diagram, an article managing apparatus of the embodiment 1 comprises: a network receiving unit 1; a consumables use residual amount discriminating unit 2; a consumables ordering discriminating unit 3; a consumables price DB (database) 4; a budget DB (database) 5; a consumables ordering processing unit 6; a network transmitting unit 7; and a control unit 8.

Prior to explaining details of those component elements, an outline of a print system in which the article managing apparatus according to the invention is arranged will be described.

Figure 2:
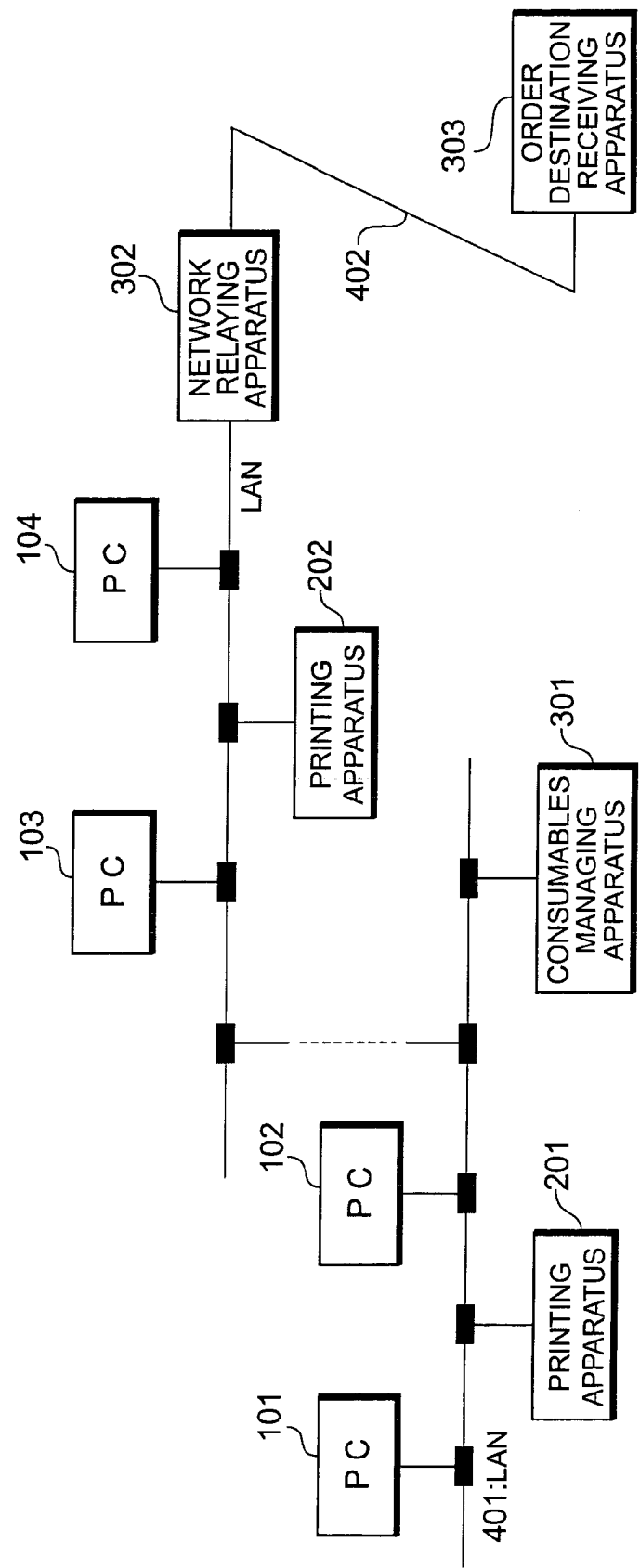
FIG. 2 is a constructional diagram of a print system.

FIG. 2 is a constructional diagram of the print system.

As shown in the diagram, in the print system to which an article managing apparatus 301 according to the invention is connected, an arbitrary number of PCs (personal computers) 101 to 104, an arbitrary number of printing apparatuses 201 and 202, and the article managing apparatus 301 are connected to a LAN (Local Area Network) 401. The LAN 401 is further connected to a communication line 402 through a network relaying apparatus 302. An order destination receiving apparatus 303 is connected to the communication line 402.

As shown in the diagram, in the print system according to the invention, the PCs (personal computers) 101 to 104 are connected to the printing apparatuses 201 and 202 through the LAN 401, respectively. Although the four PCs and the two printing apparatuses are limitatively shown here for convenience of explanation, generally, a number of other terminal apparatuses (not shown) are connected.

The PCs 101 to 104 are terminal apparatuses by which the users form print jobs and send them to the printing apparatuses 201 and 202.

The printing apparatuses 201 and 202 are terminal apparatuses which receive the print jobs from the PCs 101 to 104 through the LAN 401 and output print images.

The LAN 401 is a network line equipped for a small area.

The article managing apparatus 301 is a terminal apparatus for managing consumables for the printing apparatuses in the print system including an arbitrary number of printing apparatuses. Ordinarily, in many cases, the apparatus 301 is selected only for management of the consumables from the PCs connected to the LAN 401. Particularly, in recent years, there are many kinds of use forms of the printing apparatuses as a print system in which a plurality of printing apparatuses are connected to the LAN and shared by the PCs connected to the same LAN. Therefore, a dedicated PC for concentratedly performing stock management, ordering work, and the like of the consumables of those plurality of printing apparatuses is often arranged.

The communication line 402 is the ordinary public line. The LAN 401 is connected to the communication line 402 through the network relaying apparatus 302. Further, the article managing apparatus 301 and the order destination receiving apparatus 303 serving as an order destination to which the consumables are ordered are connected to the communication line 402.

The invention relates to the article managing apparatus 301 which is arranged in such a print system.

The outline of the print system in which the article managing apparatus according to the invention is arranged has been described above. Returning to FIG. 1, the construction of the article managing apparatus will be described in detail.

The network receiving unit 1 is an interface portion of the article managing apparatus 301 (FIG. 2) to the LAN 401 (FIG. 2) and this portion receives predetermined information from the LAN 401 (FIG. 2).

The consumables use residual amount discriminating unit 2 is a portion which receives information indicative of use residual amounts of the consumables from the printing apparatuses 201 and 202 connected to the LAN 401 (FIG. 2) through the network receiving unit 1. The consumables use residual amount information is stored in a predetermined memory every printing apparatus as consumables residual amounts of each printing apparatus measured by various sensors provided for each printing apparatus. This information is stored in the state where it can be read out from the article managing apparatus 301 (FIG. 2). The consumables use residual amount discriminating unit 2 corresponds to residual amount detecting means in Claims.

The consumables ordering discriminating unit 3 is a portion which discriminates the necessity of the ordering of the consumables from the use residual amount of each of the consumables on the basis of a predetermined discrimination reference. This predetermined discrimination reference is preset and has been stored in the consumables price DB 4 of each printing apparatus every consumables or it can be stored in a predetermined memory every consumables in the state where it can be read out from the article managing apparatus 301 (FIG. 2). The consumables ordering discriminating unit 3 corresponds to ordering necessity discriminating means in Claims.

The consumables price DB 4 is a memory for previously storing the predetermined discrimination reference to discriminate the necessity of the ordering of the consumables from the price and the use residual amount of each of the consumables.

The budget DB 5 is a memory in which a predetermined purchase money amount has been stored. Ordinarily, the predetermined purchase money amount is often a budget limit allocated to the consumables in the print systems equipped in organizations such as enterprises, government and municipal offices, and the like in which the budget has been allocated every division.

The consumables price DB 4 and the budget DB 5 correspond to consumables data storing means in Claims.

The consumables ordering processing unit 6 is a portion for collectively ordering the consumables which need to be ordered. That is, when an accumulated money amount obtained by order money amount accumulating means 8-1 of the control unit 8, which will be explained hereinafter, exceeds the predetermined purchase money amount, the ordering necessity consumables determined by the consumables ordering discriminating unit 3 that the ordering is necessary until just before the accumulated money amount exceeds the predetermined purchase money amount are collected in a predetermined format and ordered.

The network transmitting unit 7 is an interface portion of the article managing apparatus 301 (FIG. 2) for transmitting predetermined information such as order information or the like collected into the predetermined format to the LAN 401 (FIG. 2).

The control unit 8 is a CPU (Central Processing Unit) for controlling the whole article managing apparatus 301 (FIG. 2).

Particularly, in the embodiment, the control unit 8 is a portion having the order money amount accumulating means 8-1, order consumables deciding means 8-2, and target selecting means 8-3.

The order money amount accumulating means 8-1 is control means for accumulating and adding order money amounts of the ordering necessity consumables determined by the consumables ordering discriminating unit 3 that the ordering is necessary on the basis of the prices of the consumables stored in the consumables price DB 4.

The order consumables deciding means 8-2 is control means for deciding the ordering necessity consumables, as order consumables, determined by the consumables ordering discriminating unit 3 that the ordering is necessary until just before the accumulated money amount obtained by the order money amount accumulating means 8-1 exceeds the predetermined purchase money amount stored in the budget DB 5.

The target selecting means 8-3 is control means for, when the examination of all consumables is finished with respect to a predetermined printing apparatus (for example, the printing apparatus 201 (FIG. 2)), changing an examination target to another printing apparatus (for example, the printing apparatus 202 (FIG. 2)).

The operation of the article managing apparatus of the embodiment 1 having the construction described above will now be explained.

Figure 3:
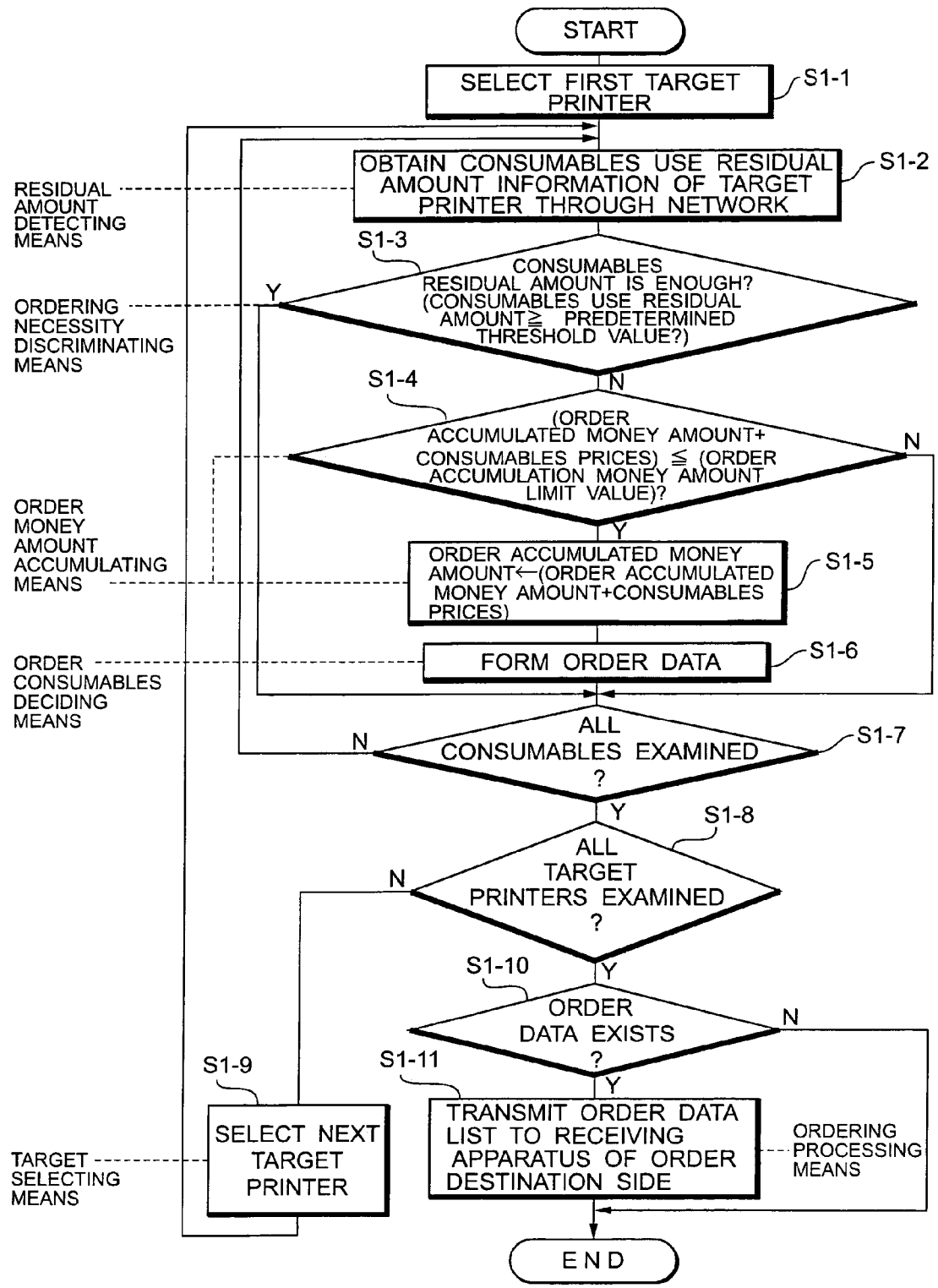
FIG. 3 is a flowchart for the operation in the embodiment 1.

FIG. 3 is a flowchart for the operation in the embodiment 1.

FIG. 4 is an explanatory diagram of the information showing the consumables use residual amounts.

FIG. 5 is an explanatory diagram of order data (part 1).

FIG. 6 is an explanatory diagram of a list table of the order data.

The operation of the embodiment 1 will now be explained in order of steps S1-1 to S1-11.

Step S1-1

The target selecting means 8-3 (FIG. 1) in the control unit 8 selects, for example, the printing apparatus 201 (FIG. 2) as an examination target.

Step S1-2

The consumables use residual amount discriminating unit 2 (FIG. 1) fetches the consumables use residual amount information from the target printing apparatus (the printing apparatus 201 (FIG. 2)) through the network receiving unit (FIG. 1). This step corresponds to the residual amount detecting means in Claims.

Step S1-3

The consumables ordering discriminating unit 3 (FIG. 1) discriminates whether or not the consumables use residual amount is equal to or larger than the predetermined threshold value on the basis of the consumables use residual amount information fetched by the consumables use residual amount discriminating unit 2 (FIG. 1). If it is equal to or larger than the predetermined threshold value (YES in step S1-3), the processing routine advances to step S1-7. If it is smaller than the predetermined threshold value (NO in step S1-3), the processing routine advances to step S1-4. As shown in the table of FIG. 4, the name of the consumables, the use residual amount, and the discrimination threshold value are shown in the consumables use residual amount information every printing apparatus. The necessity of the ordering is discriminated from the discrimination threshold value as shown in the right end of the table. This step corresponds to the ordering necessity discriminating means in Claims.

Step S1-4

The order money amount accumulating means 8-1 (FIG. 1) in the control unit 8 discriminates whether or not the value obtained by adding the prices of the consumables determined by the consumables ordering discriminating unit 3 (FIG. 1) that the ordering is necessary to the order accumulation money amount exceeds a predetermined purchase money amount (order accumulation limit money amount). If it exceeds the predetermined purchase money amount (NO in step S1-4), the processing routine advances to step S1-7. If it does not exceed (YES in step S1-4), the processing routine advances to step S1-5.

Step S1-5

The order money amount accumulating means 8-1 (FIG. 1) in the control unit 8 replaces the order accumulation money amount by the value obtained by adding the prices of the consumables which have been determined to be the ordering necessity consumables to the order accumulation money amount (accumulates and adds the prices of the ordering necessity consumables). Steps S1-4 and S1-5 correspond to the order money amount accumulating means in Claims.

Step S1-6

The order consumables deciding means 8-2 (FIG. 1) in the control unit 8 forms order data. As shown in the table of FIG. 5, the name of the consumables, an order code, the price, the accumulation order money amount, and an accumulation order money amount limit value are shown in the order data every printing apparatus. The accumulation order money amount limit value corresponds to a predetermined purchase money amount in Claims. The consumables corresponding to the period of time until the accumulation order money amount exceeds the accumulation order money amount limit value (until INK CARTRIDGE in a C printer in FIG. 5) become the order consumables. Step S1-6 corresponds to the order consumables deciding means in Claims.

Step S1-7

Steps S1-2 to S1-7 are repeated with respect to all of the consumables of the target printing apparatus (the printing apparatus 201 (FIG. 2)) under the control of the control unit 8 (FIG. 1). After all of the consumables were examined, the processing routine advances to step S1-8.

Step S1-8

If the examination is finished with respect to all of the printing apparatuses, the processing routine advances to step S1-10. If the examination is not finished yet with respect to all of the printing apparatuses, the processing routine advances to step S1-9.

Step S1-9

The target selecting means 8-3 in the control unit 8 changes the examination target. The examination target is changed to the printing apparatus 202 (FIG. 2) here. Steps S1-8 and S1-9 correspond to the target selecting means in Claims.

Step S1-10

If the order data exists, step S11 follows. If it does not exist, the processing flow is finished.

Step S1-11

The consumables ordering processing unit 6 (FIG. 1) converts the order data into document data (order data list table) in a predetermined format, sends it to the order destination receiving apparatus 303 (FIG. 2) through the network transmitting unit 7 (FIG. 1), and finishes the processing flow. As shown in FIG. 6, an article number, an article name, a unit price, a quantity, and an order total money amount are shown in the order data list table. This step corresponds to the ordering processing means in Claims.

Although the explanation has been made above on the assumption that the consumables use residual amount discriminating unit 2 (FIG. 1), the consumables ordering discriminating unit 3 (FIG. 1), and the consumables ordering processing unit 6 (FIG. 1) are component elements which are separately constructed, the invention is not limited to such an example. That is, all or a part of the consumables use residual amount discriminating unit 2 (FIG. 1), the consumables ordering discriminating unit 3 (FIG. 1), and the consumables ordering processing unit 6 (FIG. 1) can be also constructed as control means of the control unit 8 (FIG. 1) based on a computer-readable program in a manner similar to the order money amount accumulating means 8-1 (FIG. 1), the order consumables deciding means 8-2 (FIG. 1), and the target selecting means 8-3 (FIG. 1).

As described above, according to the embodiment 1, such an effect is obtained that the consumables can be automatically managed and ordered without exceeding the budget limit even in the enterprises, government and municipal offices, or the like in which the budget management for purchasing the consumables is executed.

Embodiment 2

Figure 7:
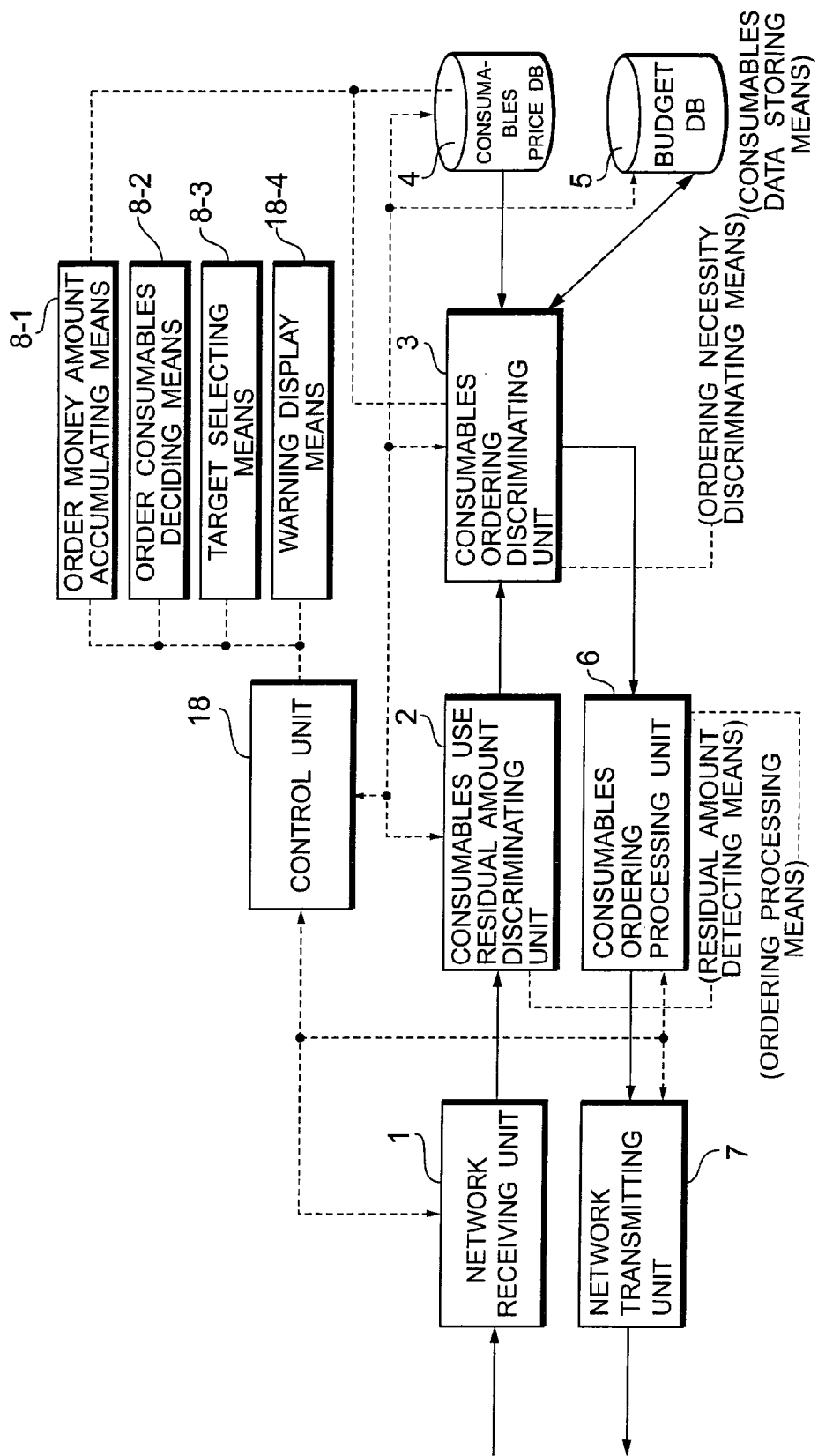
FIG. 7 is a block diagram showing a construction of the embodiment 2.

FIG. 7 is a block diagram showing a construction of the embodiment 2.

As shown in the diagram, an article managing apparatus of the embodiment 2 comprises: the network receiving unit 1; the consumables use residual amount discriminating unit 2; the consumables ordering discriminating unit 3; the consumables price DB (database) 4; the budget DB (database) 5; the consumables ordering processing unit 6; the network transmitting unit 7; and a control unit 18.

Only the portions different from the embodiment 1 will be described. The portions similar to those of the embodiment 1 are designated by the same reference numerals.

The control unit 18 is a CPU (Central Processing Unit) for controlling the whole article managing apparatus 301 (FIG. 2). Particularly, in the embodiment, the control unit 18 is a portion having the order money amount accumulating means 8-1, the order consumables deciding means 8-2, the target selecting means 8-3, and warning display means 18-4.

The warning display means 18-4 is a portion for displaying a warning to the operator, thereby notifying that there are consumables which could not be ordered although they are the ordering necessity consumables. Since all of other component elements are similar to those of the embodiment 1 if any, their description is omitted here.

The operation of the article managing apparatus of the embodiment 2 having the construction described above will now be described.

Figure 8:
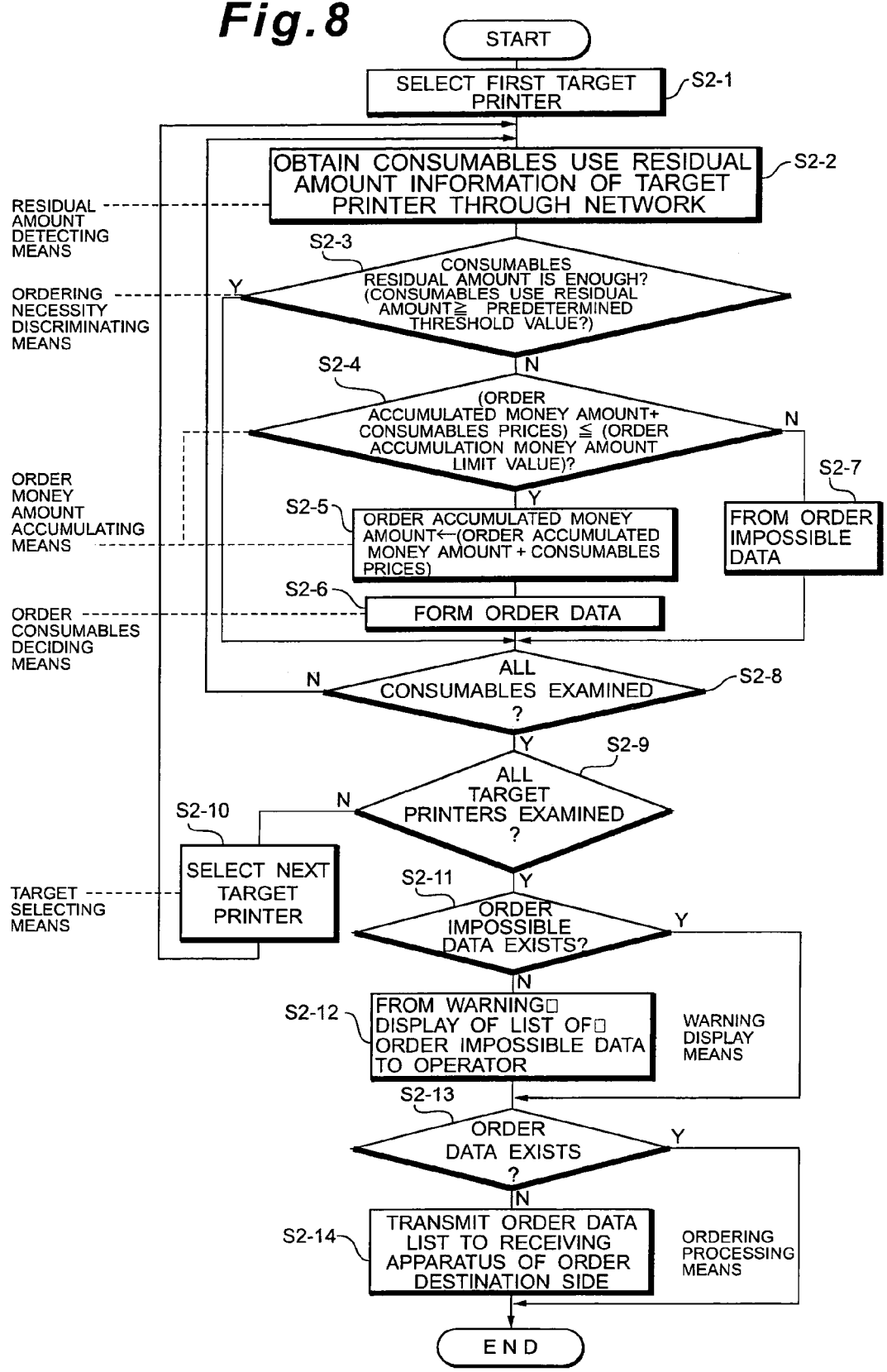
FIG. 8 is a flowchart for the operation in the embodiment 2.

FIG. 8 is a flowchart for the operation in the embodiment 2.

FIG. 9 is an explanatory diagram of a list table of order impossible data.

The operation of the embodiment 2 will now be explained in order of steps S2-1 to S2-14.

Step S2-1

The target selecting means 8-3 (FIG. 7) in the control unit 18 selects, for example, the printing apparatus 201 (FIG. 2) as an examination target.

Step S2-2

The consumables use residual amount discriminating unit 2 (FIG. 7) fetches the consumables use residual amount information from the target printing apparatus (the printing apparatus 201 (FIG. 2)) through the network receiving unit 1 (FIG. 7). This step corresponds to the residual amount detecting means in Claims.

Step S2-3

The consumables ordering discriminating unit 3 (FIG. 7) discriminates whether or not the consumables use residual amount is equal to or larger than the predetermined threshold value on the basis of the consumables use residual amount information fetched by the consumables use residual amount discriminating unit 2 (FIG. 7). If it is equal to or larger than the predetermined threshold value (YES in step S2-3), the processing routine advances to step S2-8. If it is smaller than the predetermined threshold value (NO in step S2-3), the processing routine advances to step S2-4. As shown in the table of FIG. 4, the name of the consumables, the use residual amount, and the discrimination threshold value are shown in the consumables use residual amount information every printing apparatus. The necessity of the ordering is discriminated from the discrimination threshold value as shown in the right end of the table. This step corresponds to the ordering necessity discriminating means in Claims.

Step S2-4

The order money amount accumulating means 8-1 (FIG. 7) in the control unit 18 discriminates whether or not the value obtained by adding the prices of the consumables determined by the consumables ordering discriminating unit 3 (FIG. 7) that the ordering is necessary to the order accumulation money amount exceeds the predetermined purchase money amount (order accumulation limit money amount). If it exceeds the predetermined purchase money amount (NO in step S2-4), the processing routine advances to step S2-7. If it does not exceed (YES in step S2-4), the processing routine 25 advances to step S2-5.

Step S2-5

The order money amount accumulating means 8-1 (FIG. 7) in the control unit 18 replaces the order accumulation money amount by the value obtained by adding the prices of the consumables which have been determined to be the ordering necessity consumables to the order accumulation money amount (accumulates and adds the prices of the ordering necessity consumables). Steps S2-4 and S2-5 correspond to the order money amount accumulating means in Claims.

Step S2-6

The order consumables deciding means 8-2 (FIG. 7) in the control unit 18 forms order data. As shown in the table of FIG. 5, the name of the consumables, the order code, the price, the accumulation order money amount, and an accumulation order money amount limit value are shown in the order data every printing apparatus. The accumulation order money amount limit value corresponds to the predetermined purchase money amount in Claims. The consumables corresponding to the period of time until the accumulation order money amount exceeds the accumulation order money amount limit value (until INK CARTRIDGE in the C printer in FIG. 5) become the order consumables. Step S2-6 corresponds to the order consumables deciding means in Claims.

Step S2-7

The order consumables deciding means 8-2 (FIG. 7) in the control unit 18 discloses the ordering necessity consumables (hatched portion in FIG. 5) corresponding to the period of time after the accumulation order money amount exceeded the accumulation order money amount limit value as order impossible data into the order data (FIG. 5).

Step S2-8

Steps S2-2 to S2-8 are repeated with respect to all of the consumables of the target printing apparatus (the printing apparatus 201 (FIG. 2)) under the control of the control unit 18 (FIG. 7). After all of the consumables were examined, the processing routine advances to step S2-9.

Step S2-9

If the examination is finished with respect to all of the printing apparatuses, the processing routine advances to step S2-11. If the examination is not finished yet with respect to all of the printing apparatuses, the processing routine advances to step S2-10.

Step S2-10

The target selecting means 8-3 (FIG. 7) in the control unit 18 changes the examination target. The examination target is changed to the printing apparatus 202 (FIG. 2) here. Steps S2-9 and S2-10 correspond to the target selecting means in Claims.

Step S2-11

If the order impossible data exists, step S2-12 follows. If it does not exist, step S2-13 follows.

Step S2-12

The warning display means 18-4 (FIG. 7) in the control unit 18 displays an order impossible data list table onto a predetermined display (not shown) of the article managing apparatus 301 (FIG. 2). As shown in FIG. 9, an apparatus ID, the apparatus name, the article name, the article number, and the unit price are shown in this order impossible data list table. A warning showing that although the consumables approach the expiration of the life, since the order accumulation money amount exceeds the upper limit value, they cannot be ordered is displayed. This step corresponds to the warning display means in Claims.

Step S2-13

If the order data exists, step S2-14 follows. If it does not exist, the processing flow is finished.

Step S2-14

The consumables ordering processing unit 6 (FIG. 7) converts the order data into the document data (order data list table) in the predetermined format, sends it to the order destination receiving apparatus 303 (FIG. 2) through the network transmitting unit 7 (FIG. 7), and finishes the processing flow. As shown in FIG. 6, the article number, the article name, the unit price, the quantity, and the order total money amount are shown in the order data list table. This step corresponds to the ordering processing means in Claims.

As described above, according to the embodiment 2, since the warning display means 18-4 (FIG. 7) is provided, the warning can be displayed to the operator with respect to the ordering necessity consumables which cannot be ordered due to the excessive budget. Thus, such an effect is obtained that since the administrator can grasp the articles and apparatuses in which the consumables could not be automatically ordered, that consequently helps him to take a proper measure.

Embodiment 3

Figure 10:
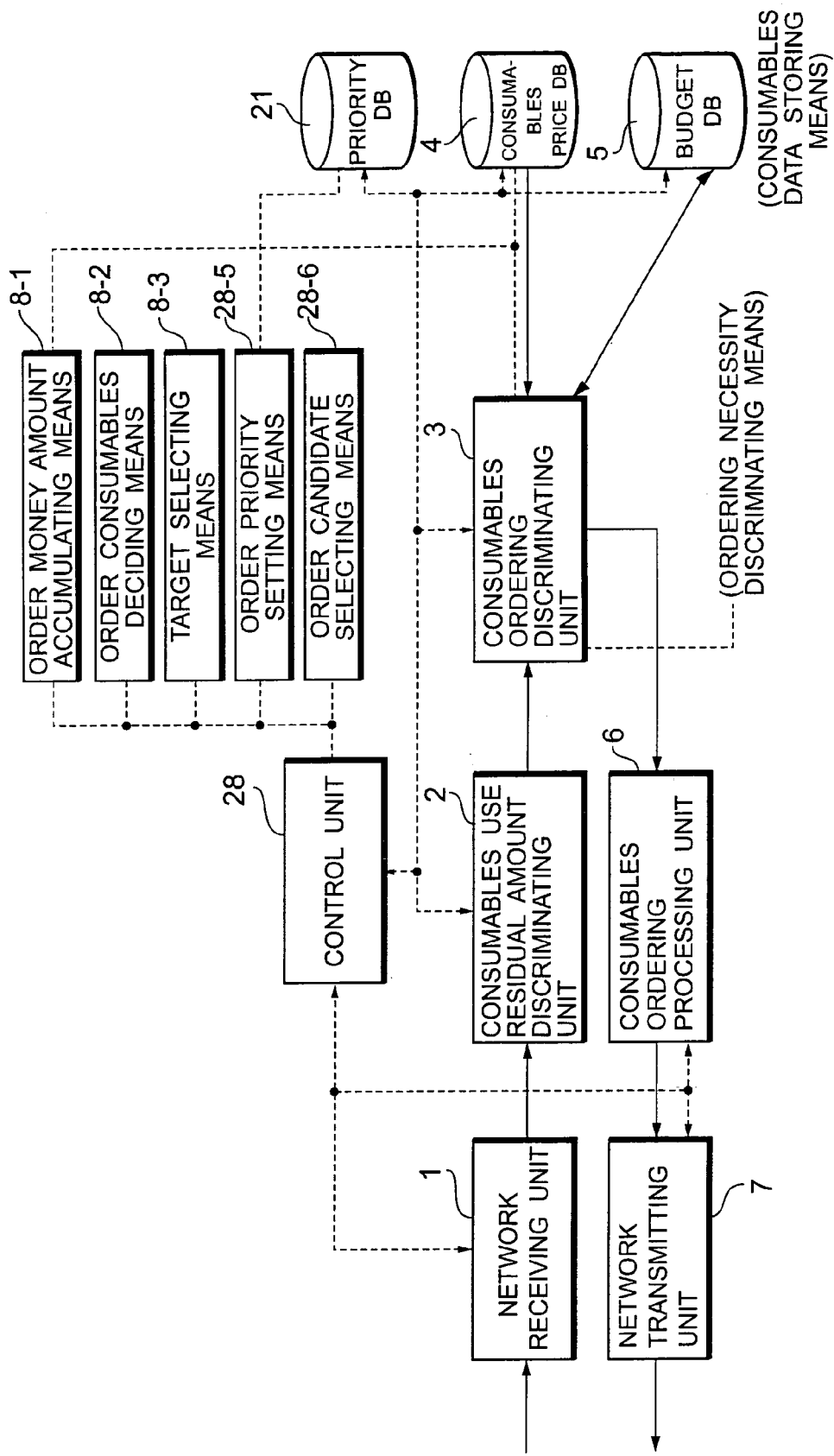
FIG. 10 is a block diagram showing a construction of the embodiment 3.

FIG. 10 is a block diagram showing a construction of the embodiment 3.

As shown in the diagram, an article managing apparatus of the embodiment 3 comprises: the network receiving unit 1; the consumables use residual amount discriminating unit 2; the consumables ordering discriminating unit 3; the consumables price DB (database) 4; the budget DB (database) 5; the consumables ordering processing unit 6; the network transmitting unit 7; a priority DB 21; and a control unit 28.

Only the portions different from the embodiment 1 will be described. The portions similar to those of the embodiment 1 are designated by the same reference numerals.

The priority DB 21 is a memory to store priority data in which priorities of the consumables have been predetermined.

The control unit 28 is a CPU (Central Processing Unit) for controlling the whole article managing apparatus 301 (FIG. 2). Particularly, in the embodiment, the control unit 28 is a portion having the order money amount accumulating means 8-1, the order consumables deciding means 8-2, the target selecting means 8-3, order priority setting means 28-5, and order candidate selecting means 28-6.

The order priority setting means 28-5 is control means for setting the order priority on the basis of the order priority data stored in the priority DB 21 with respect to the ordering necessity consumables (order candidate consumables here) determined by the consumables ordering discriminating unit 3 that the ordering is necessary.

The order candidate selecting means 28-6 is control means for forming order consumables candidate data by collecting the consumables in which the consumables use residual amounts are less than the predetermined threshold value from the consumables use residual amount information obtained by the consumables use residual amount discriminating unit 2.

The priority DB 21 is a memory to previously store order priority data in which the priorities of the consumables have been predetermined.

Since all of other component elements are similar to those of the embodiment 1, their description is omitted here.

The operation of the article managing apparatus of the embodiment 3 having the construction described above will now be described.

Figure 11:
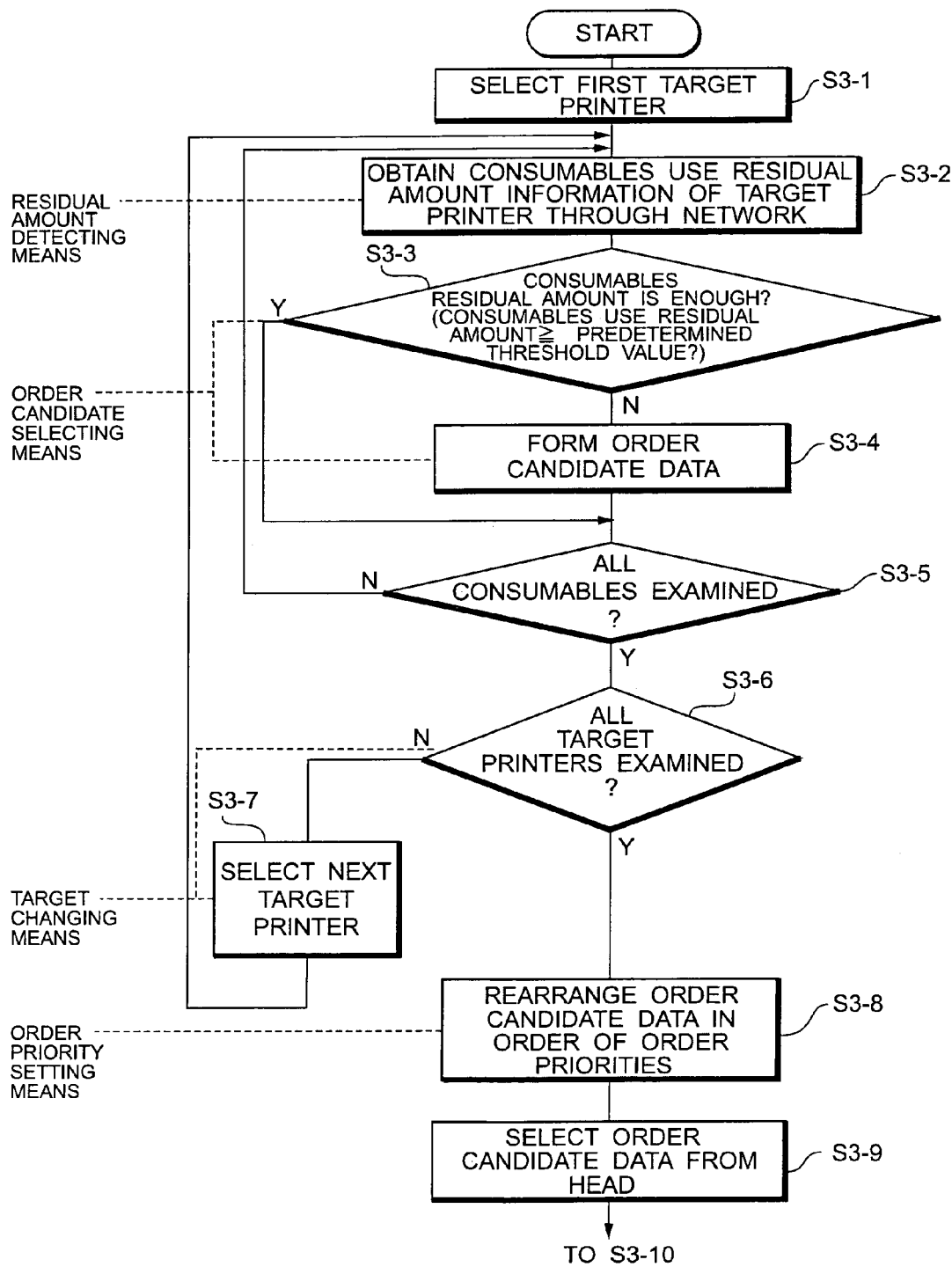
FIG. 11 is a flowchart for the operation in the embodiment 3 (part 1)

FIG. 11 is a flowchart for the operation in the embodiment 3 (part 1).

Figure 12:
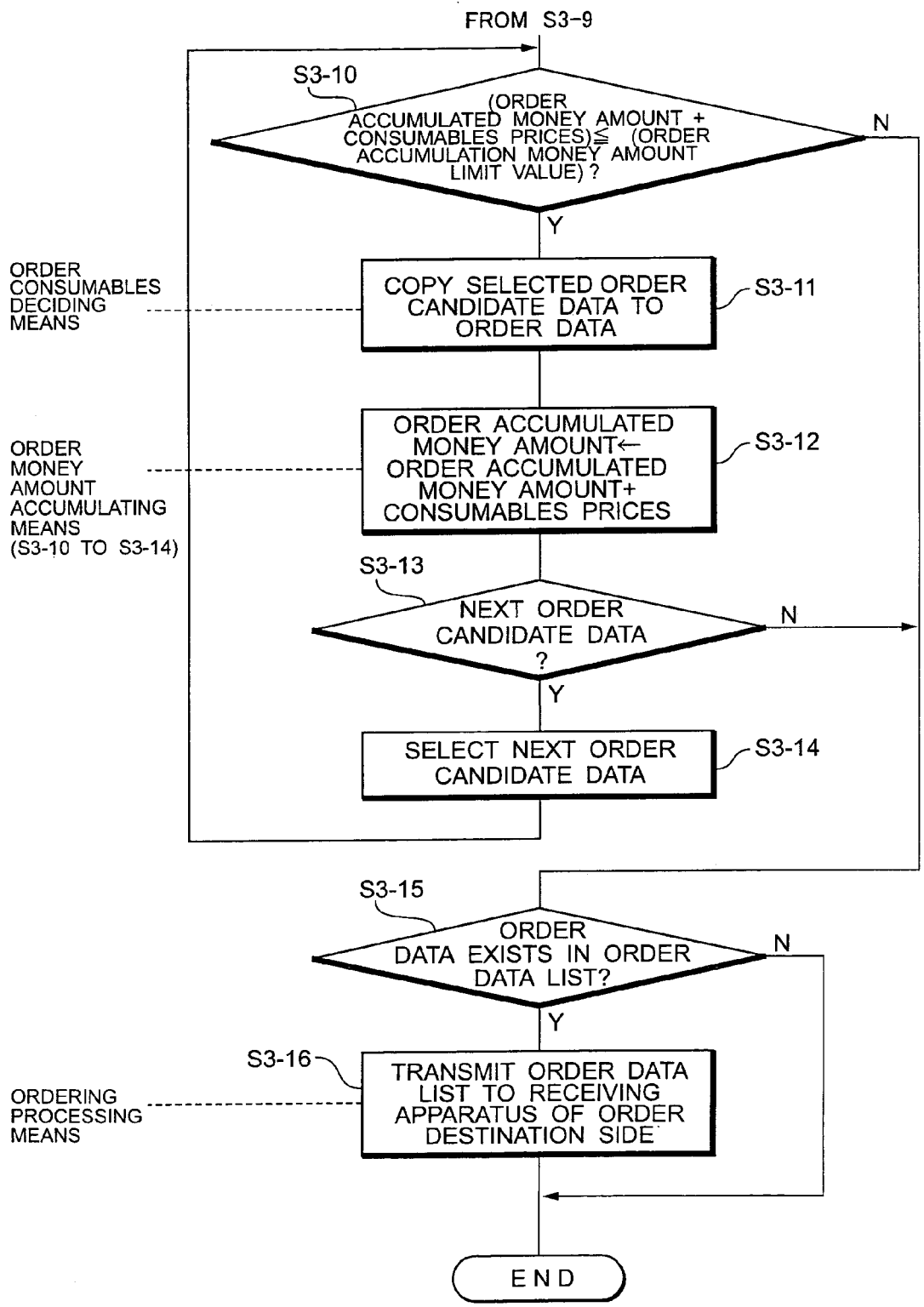
FIG. 12 is a flowchart for the operation in the embodiment 3 (part 2)

FIG. 12 is a flowchart for the operation in the embodiment 3 (part 2).

FIG. 13 is an explanatory diagram of the order candidate data (part 1).

FIG. 14 is an explanatory diagram of the order priority data.

FIG. 15 is an explanatory diagram of the order data (part 2).

The operation of the embodiment 3 will now be explained in order of steps S3-1 to S3-16.

Step S3-1

The target selecting means 8-3 (FIG. 10) in the control unit 28 selects, for example, the printing apparatus 201 (FIG. 2) as an examination target.

Step S3-2

The consumables use residual amount discriminating unit 2 (FIG. 10) fetches the consumables use residual amount information from the target printing apparatus (the printing apparatus 201 (FIG. 2)) through the network receiving unit 1 (FIG. 10). This step corresponds to the residual amount detecting means in Claims.

Step S3-3

The consumables ordering discriminating unit 3 (FIG. 10) discriminates whether or not the consumables use residual amount is equal to or larger than the predetermined threshold value on the basis of the consumables use residual amount information fetched by the consumables use residual amount discriminating unit 2 (FIG. 10). If it is equal to or larger than the predetermined threshold value (YES in step S3-3), the processing routine advances to step S3-5. If it is smaller than the predetermined threshold value (NO in step S3-3), the processing routine advances to step S3-4.

Step S3-4

The order candidate selecting means 28-6 (FIG. 10) in the control unit 28 forms the order consumables candidate data by collecting the consumables in which the consumables use residual amounts are less than the predetermined threshold value. As shown in the table of FIG. 13, the name of the consumables, the order code, and the price are shown in the order consumables candidate data every printing apparatus. Steps S3-3 and S3-4 correspond to the order candidate selecting means in Claims.

Step S3-5

Steps S3-2 to S3-5 are repeated with respect to all of the consumables of the target printing apparatus (the printing apparatus 201 (FIG. 2)) under the control of the control unit 28 (FIG. 10). After all of the consumables were examined, the processing routine advances to step S3-6.

Step S3-6

If the examination is finished with respect to all of the printing apparatuses, the processing routine advances to step S3-8. If the examination is not finished yet with respect to all of the printing apparatuses, the processing routine advances to step S3-7.

Step S3-7

The target selecting means 8-3 (FIG. 10) in the control unit 28 changes the examination target. The examination target is changed to the printing apparatus 202 (FIG. 2) here. Steps S3-6 and S3-7 correspond to the target selecting means in Claims.

Step S3-8

The order priority setting means 28-5 (FIG. 10) in the control unit 28 forms the order data (FIG. 15) by rearranging the order candidate data in order of the priorities on the basis of the order priority data shown in FIG. 14. As shown in FIG. 14, the order priorities of each of the consumables have previously been shown in the order priority data.

Step S3-9

The order money amount accumulating means 8-1 (FIG. 10) in the control unit 28 fetches the consumables shown in the head column from the order data (FIG. 15).

Step S3-10

The order money amount accumulating means 8-1 (FIG. 10) in the control unit 28 discriminates whether or not the value obtained by adding the prices of the consumables fetched from the order data (FIG. 15) to the order accumulation money amount exceeds the predetermined purchase money amount (order accumulation limit money amount). If it exceeds the predetermined purchase money amount (NO in step S3-10), the processing routine advances to step S3-15. If it does not exceed (YES in step S3-10), the processing routine advances to step S3-11.

Step S3-11

The order consumables deciding means 8-2 (FIG. 10) in the control unit 28 determines those consumables as order consumables. This step corresponds to the order consumables deciding means in Claims.

Step S3-12

The order money amount accumulating means 8-1 (FIG. 10) in the control unit 28 replaces the order accumulation money amount by the value obtained by adding the prices of the consumables which have been determined to be the ordering necessity consumables to the order accumulation money amount (accumulates and adds the prices of the ordering necessity consumables).

Step S3-13

The order money amount accumulating means 8-1 (FIG. 10) in the control unit 28 advances to step S3-14 if the consumables shown in the next order remain in the order priority data remain. After all of the order priority data was fetched, the processing routine advances to step S3-15.

Step S3-14

The order money amount accumulating means 8-1 (FIG. 10) in the control unit 28 fetches the consumables shown in the next order from the order data (FIG. 15) and returns to step S3-10. Steps S3-10 to S3-14 correspond to the order money amount accumulating means in Claims.

Step S3-15

If the order data (order consumables) exists, step S3-16 follows. If it does not exist, the processing flow is finished.

Step S3-16

The consumables ordering processing unit 6 (FIG. 10) converts the order data into the document data (order data list table) in the predetermined format, sends it to the order destination receiving apparatus 303 (FIG. 2) through the network transmitting unit 7 (FIG. 10), and finishes the processing flow. As shown in FIG. 6, the article number, the article name, the unit price, the quantity, and the order total money amount of the order consumables are shown in the order data list table. This step corresponds to the ordering processing means in Claims.

As described above, according to the embodiment 3, since the order priority setting means 28-5 (FIG. 10) is provided, the consumables whose emergency degree is so high that if they reach the expiration of the life, the printing apparatus cannot be used can be preferentially ordered. The effective automatic ordering which does not obstruct the operation of the printing apparatus can be performed in the range of the budget. Thus, such an effect that the operation of the printing apparatus can be easily executed can be obtained.

Embodiment 4

Figure 16:
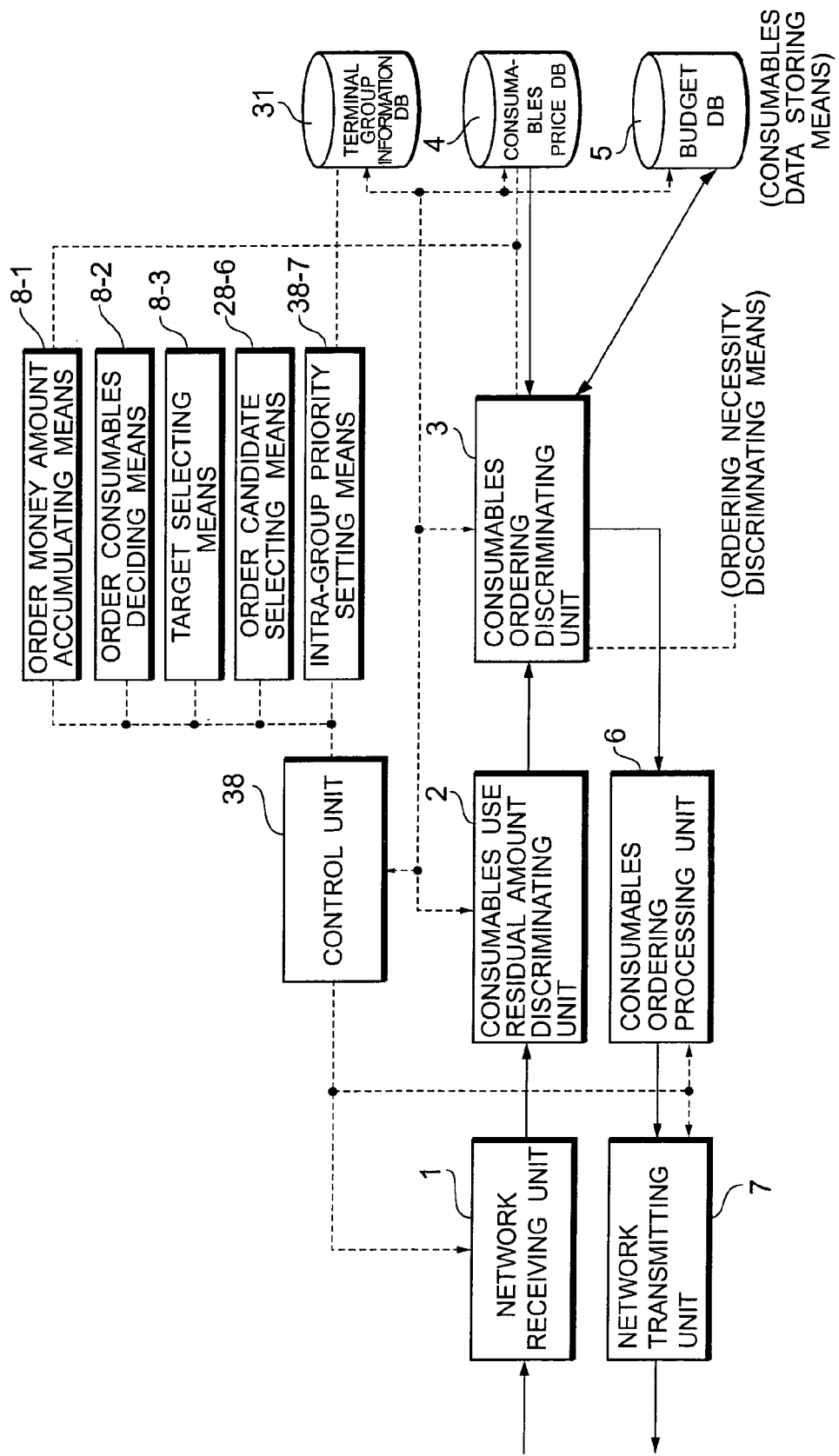
FIG. 16 is a block diagram showing a construction of the embodiment 4.

FIG. 16 is a block diagram showing a construction of the embodiment 4.

As shown in the diagram, an article managing apparatus of the embodiment 4 comprises: the network receiving unit 1; the consumables use residual amount discriminating unit 2; the consumables ordering discriminating unit 3; the consumables price DB (database) 4; the budget DB (database) 5; the consumables ordering processing unit 6; the network transmitting unit 7; a control unit 38; and a terminal group information DB 31.

Only the portions different from the embodiment 1 will be described. The portions similar to those of the embodiment 1 are designated by the same reference numerals as those in the embodiment 1.

The terminal group information DB 31 is a memory to previously store terminal group setting data to decide the grouping of a plurality of printing apparatuses.

The control unit 38 is a CPU (Central Processing Unit) for controlling the whole article managing apparatus 301 (FIG. 2). Particularly, in the embodiment, the control unit 38 is a portion having the order money amount accumulating means 8-1, the order consumables deciding means 8-2, the target selecting means 8-3, the order candidate selecting means 28-6, and intra-group priority setting means 38-7.

As disclosed in the embodiment 3, the order candidate selecting means 28-6 is the control means for forming the order consumables candidate data by collecting the consumables in which the consumables use residual amounts are less than the predetermined threshold value from the consumables use residual amount information obtained by the consumables use residual amount discriminating unit 2.

The intra-group priority setting means 38-7 is control means for setting the order priorities on the basis of the grouping of the terminal group setting data with respect to the ordering necessity consumables determined by the consumables ordering discriminating unit 3 that the ordering is necessary.

Since all of other component elements are similar to those of the embodiment 1, their description is omitted here.

The operation of the article managing apparatus of the embodiment 4 having the construction described above will now be described.

Figure 17:
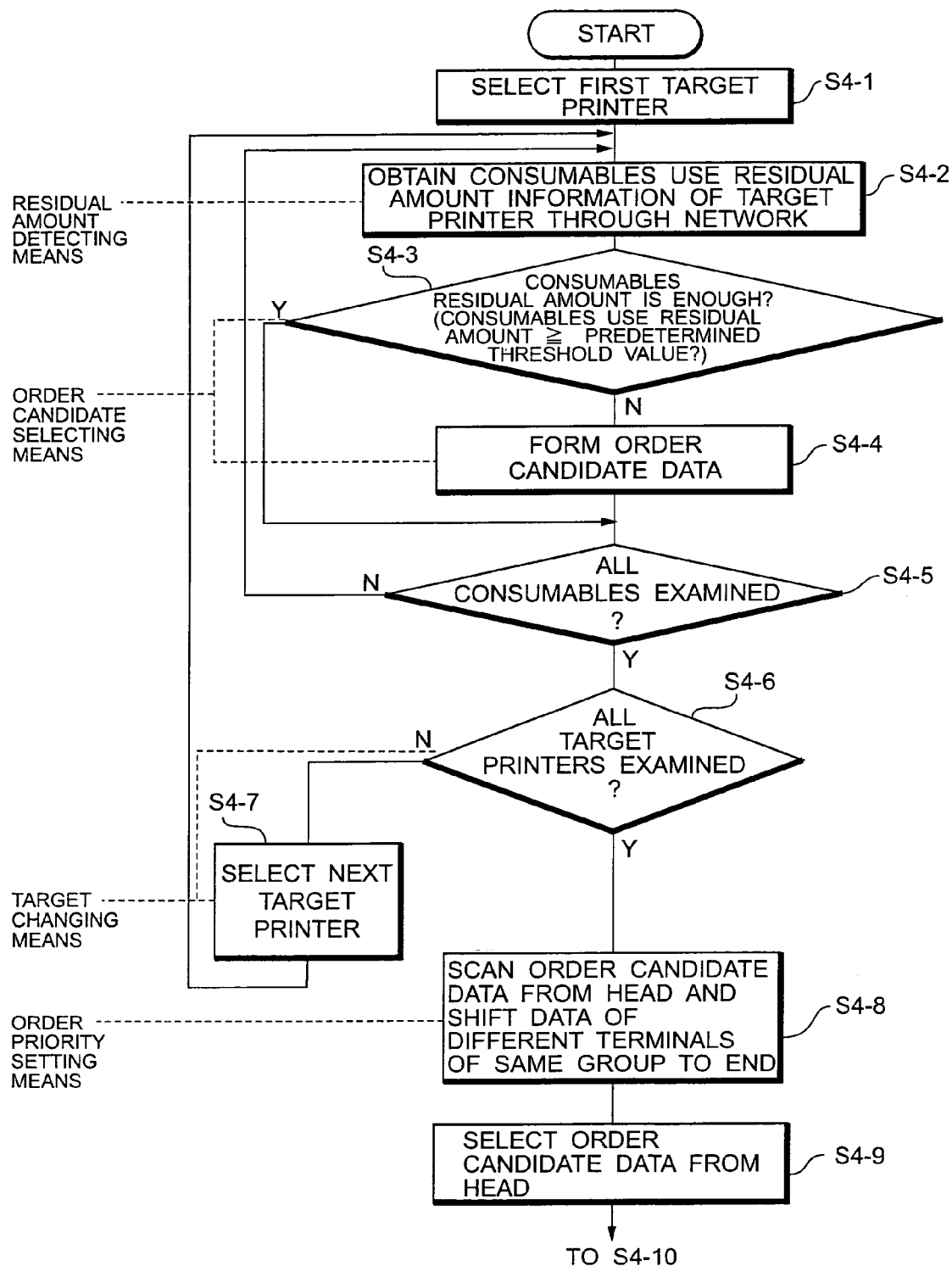
FIG. 17 is a flowchart for the operation in the embodiment 4 (part 1)

FIG. 17 is a flowchart for the operation in the embodiment 4 (part 1).

Figure 18:
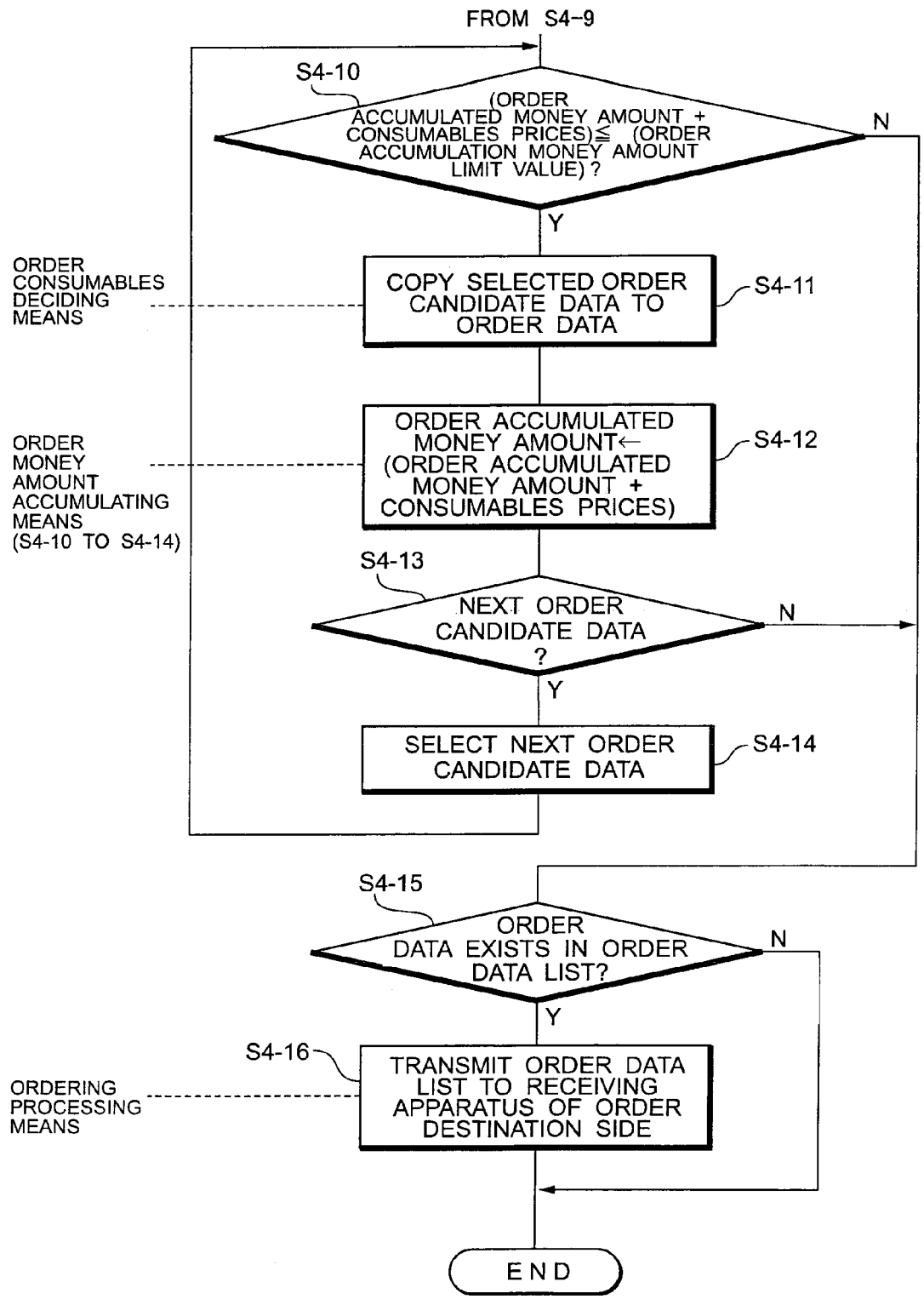
FIG. 18 is a flowchart for the operation in the embodiment 4 (part 2)

FIG. 18 is a flowchart for the operation in the embodiment 4 (part 2).

FIG. 19 is an explanatory diagram of the order candidate data (part 2).

FIG. 20 is an explanatory diagram of the terminal group setting data.

FIG. 21 is an explanatory diagram of the order data (part 3).

The operation of the embodiment 4 will now be explained in order of steps S4-1 to S4-16.

Step S4-1

The target selecting means 8-3 (FIG. 16) in the control unit 38 selects, for example, the printing apparatus 201 (FIG. 2) as an examination target.

Step S4-2

The consumables use residual amount discriminating unit 2 (FIG. 16) fetches the consumables use residual amount information from the target printing apparatus (the printing apparatus 201 (FIG. 2)) through the network receiving unit 1 (FIG. 16). This step corresponds to the residual amount detecting means in Claims.

Step S4-3

The consumables ordering discriminating unit 3 (FIG. 16) discriminates whether or not the consumables use residual amount is equal to or larger than the predetermined threshold value on the basis of the consumables use residual amount information fetched by the consumables use residual amount discriminating unit 2 (FIG. 16). If it is equal to or larger than the predetermined threshold value (YES in step S4-3), the processing routine advances to step S4-5. If it is smaller than the predetermined threshold value (NO in step S4-3), the processing routine advances to step S4-4.

Step S4-4

The order candidate selecting means 28-6 (FIG. 16) in the control unit 38 forms the order consumables candidate data by collecting the consumables in which the consumables use residual amounts are less than the predetermined threshold value. As shown in the table of FIG. 19, the name of the consumables, the order code, and the price are shown in the order consumables candidate data. Steps S4-3 and S4-4 correspond to the order candidate selecting means in Claims.

Step S4-5

Steps S4-2 to S4-5 are repeated with respect to all of the consumables of the target printing apparatus (the printing apparatus 201 (FIG. 2)) under the control of the control unit 38 (FIG. 16). After all of the consumables were examined, the processing routine advances to step S4-6.

Step S4-6

If the examination is finished with respect to all of the printing apparatuses, the processing routine advances to step S4-8. If the examination is not finished yet with respect to all of the printing apparatuses, the processing routine advances to step S4-7.

Step S4-7

The target selecting means 8-3 (FIG. 16) in the control unit 38 changes the examination target. The examination target is changed to the printing apparatus 202 (FIG. 2) here. Steps S4-6 and S4-7 correspond to the target selecting means in Claims.

Step S4-8

The intra-group priority setting means 38-7 (FIG. 16) in the control unit 38 forms the order data (FIG. 21) by rearranging the order candidate data in order of the priorities on the basis of the terminal group setting data shown in FIG. 20. That is, the order consumables candidate data (FIG. 19) is searched from the head and the consumables data of different terminals of the same group is shifted to the end. The reasons for it are that in the case where a plurality of printing apparatuses have been allocated to one group, even if one of them is disabled to be used due to the expiration of the life of the consumables, it can be replaced by another printer, however, in the case where only one printing apparatus has been allocated to one group, if this printing apparatus is disabled to be used, it cannot be replaced. As shown in FIG. 20, a belonging group (group ID) of a plurality of printing apparatuses (printer identification ID) has previously been shown in the terminal group setting data.

Step S4-9

The order money amount accumulating means 8-1 (FIG. 16) in the control unit 38 fetches the consumables shown in the head column from the order data (FIG. 21).

Step S4-10

The order money amount accumulating means 8-1 (FIG. 16) in the control unit 38 discriminates whether or not the value obtained by adding the prices of the consumables fetched from the order data (FIG. 21) to the order accumulation money amount exceeds the predetermined purchase money amount (order accumulation limit money amount). If it exceeds the predetermined purchase money amount (NO in step S4-10), the processing routine advances to step S4-15. If it does not exceed (YES in step S4-10), the processing routine advances to step S4-11.

Step S4-11

The order consumables deciding means 8-2 (FIG. 16) in the control unit 38 determines those consumables to be the order consumables. This step corresponds to the order consumables deciding means in Claims.

Step S4-12

The order money amount accumulating means 8-1 (FIG. 16) in the control unit 38 replaces the order accumulation money amount by the value obtained by adding the prices of the consumables which have been determined to be the order consumables to the order accumulation money amount (accumulates and adds the prices of the order consumables).

Step S4-13

The order money amount accumulating means 8-1 (FIG. 16) in the control unit 38 advances to step S4-14 if the consumables shown in the next order remain in the order priority data. After all of the order priority data was fetched, the processing routine advances to step S4-15.

Step S4-14

The order money amount accumulating means 8-1 (FIG. 16) in the control unit 38 fetches the consumables shown in the next order from the order data (FIG. 21) and returns to step S4-10. Steps S4-10 to S4-14 correspond to the order money amount accumulating means in Claims.

Step S4-15

If the order data (order consumables) exists, step S4-16 follows. If it does not exist, the processing flow is finished.

Step S4-16

The consumables ordering processing unit 6 (FIG. 16) converts the order data into the document data (order data list table) in the predetermined format, sends it to the order destination receiving apparatus 303 (FIG. 2) through the network transmitting unit 7 (FIG. 16), and finishes the processing flow. As shown in FIG. 6, the article number, the article name, the unit price, the quantity, and the order total money amount are shown in the order data list table. This step corresponds to the ordering processing means in Claims.

As described above, according to the embodiment 4, since the intra-group priority setting means 38-7 (FIG. 16) is provided for the terminal group information DB 31 and the control unit 38, the following effect is obtained.

In the embodiment 1, since the consumables use residual amount information obtained from the target printing apparatus is merely sequentially processed, such a situation that the consumables of the printing apparatus which can be replaced are ordered first in dependence on the selecting order of the target printer, so that the consumables of only one printing apparatus existing in another group cannot be ordered also occurs. However, according to the embodiment 4, such a situation does not occur.

Although the embodiments 1 to 4 have been described above by limiting to only the printing apparatus, the invention is not limited only to this example. That is, the invention can be also generally applied to a network connecting apparatus such as a ticket issuing apparatus or the like which need to supplement or exchange the consumables.

The present invention is not limited to the foregoing embodiments but many modifications and variations are possible within the spirit and scope of the appended claims of the invention.

What is claimed is:

1. An article managing apparatus for managing consumables of printing apparatuses in a print system having one or a plurality of printing apparatuses connected to a network, comprising:
   a consumables data storing section which stores prices of said consumables and a predetermined purchase money amount;
   an ordering necessity discriminating section which discriminates the necessity of ordering of the consumables;
   an order money amount accumulating section which accumulates and adds order money amounts of said ordering necessity consumables determined by said ordering necessity discriminating section that the ordering is necessary on the basis of the prices of said consumables; and
   an order consumables deciding section which decides said ordering necessity consumables, as order consumables, determined by said ordering necessity discriminating section that the ordering is necessary until an accumulated money amount obtained by said order money amount accumulating section exceeds said predetermined purchase money amount and which decides that it is impossible to order a portion of the ordering necessity consumables that corresponds to the accumulated money amount that exceeds the predetermined purchase amount; and
a warning display section that displays detailed information at least about the consumables that it is impossible to order and a warning that the portion of the consumables that it is impossible to order can not be ordered, wherein said detailed information of the consumables displayed by the warning display section includes respective names of the consumables and respective apparatus names corresponding to the consumables.

2. The apparatus according to claim 1, further comprising:
   a residual amount detecting section which obtains consumables use residual amounts of said printing apparatuses,
   wherein said residual amount detecting section performs discrimination on the basis of said consumables use residual amounts.

3. The apparatus according to claim 1, further comprising:
   an ordering processing section which, after received a output indicating said consumables needs order from said ordering necessity discriminating section, orders said order consumables in a predetermined format.

4. The apparatus according to claim 1, further comprising:
   a target selecting section which, when said accumulated money amount does not exceed said predetermined purchase money amount with respect to a predetermined printing apparatus and the accumulation is finished, changes a target to another printing apparatus, accumulates and adds the money amounts, and accumulates the order money amounts until the accumulated money amount exceeds said predetermined money amount.

5. The apparatus according to claim 1, further comprising:
   a warning display section which displays a warning of the necessity of the ordering with respect to the ordering necessity consumables determined by said ordering necessity discriminating section that the ordering is necessary after said accumulated money amount exceeded said predetermined purchase money amount.

6. An article managing apparatus for managing consumables of printing apparatuses in a print system having one or a plurality of printing apparatuses connected to a network, comprising:
   a consumables data storing section which stores prices of said consumables and a predetermined purchase money amount;
   an ordering necessity discriminating section which discriminates the necessity of ordering of the consumables;
   an order money amount accumulating section which accumulates and adds order money amounts of said ordering necessity consumables determined by said ordering necessity discriminating section that the ordering is necessary on the basis of the prices of said consumables; and
   an order consumables deciding section which decides said ordering necessity consumables, as order consumables, determined by said ordering necessity discriminating section that the ordering is necessary until an accumulated money amount obtained by said order money amount accumulating section exceeds said predetermined purchase money amount and which decides that it is impossible to order a portion of the ordering necessity consumables that corresponds to the accumulated money amount that exceeds the predetermined purchase amount; and
   a warning display section that displays detailed information at least about the consumables that it is impossible to order and a warning that the portion of the consumables that it is impossible to order can not be ordered, wherein said detailed information of the consumables displayed by the warning display section includes respective names of the consumables and respective apparatus identification ID corresponding to the consumables.

7. The apparatus according to claim 6, further comprising:
   a residual amount detecting section which obtains consumables use residual amounts of said printing apparatuses,
   wherein said residual amount detecting section performs discrimination on the basis of said consumables use residual amounts.

8. The apparatus according to claim 6, further comprising:
   an ordering processing section which, after received a output indicating said consumables needs order from said ordering necessity discriminating section, orders said order consumables in a predetermined format.

9. The apparatus according to claim 6, further comprising:
   a target selecting section which, when said accumulated money amount does not exceed said predetermined purchase money amount with respect to a predetermined printing apparatus and the accumulation is finished, changes a target to another printing apparatus, accumulates and adds the money amounts, and accumulates the order money amounts until the accumulated money amount exceeds said predetermined money amount.

10. The apparatus according to claim 6, further comprising:
  a warning display section which displays a warning of the necessity of the ordering with respect to the ordering necessity consumables determined by said ordering necessity discriminating section that the ordering is necessary after said accumulated money amount exceeded said predetermined purchase money amount.

11. An article managing apparatus for managing consumables of printing apparatuses in a print system having one or a plurality of printing apparatuses connected to a network, comprising:
  a consumables data storing section which stores prices of said consumables and a predetermined purchase money amount;
  an ordering necessity discriminating section which discriminates the necessity of ordering of the consumables;
  an order money amount accumulating section which accumulates and adds order money amounts of said ordering necessity consumables determined by said ordering necessity discriminating section that the ordering is necessary on the basis of the prices of said consumables;
  an order consumables deciding section which decides said ordering necessity consumables, as order consumables, determined by said ordering necessity discriminating section that the ordering is necessary until an accumulated money amount obtained by said order money amount accumulating section exceeds said predetermined purchase money amount; and
  a warning display section that displays a warning that it is impossible to order consumable articles when the accumulated money amount obtained by said order money amount accumulating section exceeds said predetermined purchase money amount, wherein the warning display section displays detailed information at least about the consumables that it is impossible to order, wherein said detailed information of the consumables displayed by the warning display section includes respective names of the consumables and respective apparatus names corresponding to the consumables.

12. The apparatus according to claim 11, further comprising:
  a residual amount detecting section which obtains consumables use residual amounts of said printing apparatuses, wherein residual amount detecting section said performs discrimination on the basis of said consumables use residual amounts.

13. The apparatus according to claim 11, further comprising:
  an ordering processing section which, after received a output indicating said consumables needs order from said ordering necessity discriminating section, orders said order consumables in a predetermined format.

14. The apparatus according to claim 11, further comprising:
  a target selecting section which, when said accumulated money amount does not exceed said predetermined purchase money amount with respect to a predetermined printing apparatus and the accumulation is finished, changes a target to another printing apparatus, accumulates and adds the money amounts, and accumulates the order money amounts until the accumulated money amount exceeds said predetermined money amount.

15. An article managing apparatus for managing consumables of printing apparatuses in a print system having one or a plurality of printing apparatuses connected to a network, comprising:
  a consumables data storing section which stores prices of said consumables and a predetermined purchase money amount;
  an ordering necessity discriminating section which discriminates the necessity of ordering of the consumables;
  an order money amount accumulating section which accumulates and adds order money amounts of said ordering necessity consumables determined by said ordering necessity discriminating section that the ordering is necessary on the basis of the prices of said consumables;
  an order consumables deciding section which decides said ordering necessity consumables, as order consumables, determined by said ordering necessity discriminating section that the ordering is necessary until an accumulated money amount obtained by said order money amount accumulating section exceeds said predetermined purchase money amount; and
  a warning display section that displays a warning that it is impossible to order consumable articles when the accumulated money amount obtained by said order money amount accumulating section exceeds said predetermined purchase money amount, wherein the warning display section displays detailed information at least about the consumables that it is impossible to order, wherein said detailed information of the consumables displayed by the warning display section includes respective names of the consumables and respective apparatus identification ID corresponding to the consumables.

16. The apparatus according to claim 15, further comprising:
  a residual amount detecting section which obtains consumables use residual amounts of said printing apparatuses, wherein residual amount detecting section said performs discrimination on the basis of said consumables use residual amounts.

17. The apparatus according to claim 15, further comprising:
  an ordering processing section which, after received a output indicating said consumables needs order from said ordering necessity discriminating section, orders said order consumables in a predetermined format.

18. The apparatus according to claim 15, further comprising:
  a target selecting section which, when said accumulated money amount does not exceed said predetermined purchase money amount with respect to a predetermined printing apparatus and the accumulation is finished, changes a target to another printing apparatus, accumulates and adds the money amounts, and accumulates the order money amounts until the accumulated money amount exceeds said predetermined money amount.

* * * * *